United States Patent
Gross et al.

(10) Patent No.: US 9,073,697 B2
(45) Date of Patent: Jul. 7, 2015

(54) APPARATUS AND METHOD FOR SEPARATION OF PIECE GOODS TO BE PLACED IN STORAGE IN AN AUTOMATED STORAGE UNIT

(71) Applicant: CareFusion Germany 326 GmbH, Kelberg (DE)

(72) Inventors: Dietmar Gross, Kelberg (DE); Christoph Hellenbrand, Kaifenheim (DE)

(73) Assignee: CAREFUSION GERMANY 326 GMBH, Kelberg (DE)

( * ) Notice: Subject to any disclaimer, the term of this patent is extended or adjusted under 35 U.S.C. 154(b) by 0 days.

(21) Appl. No.: 14/347,631

(22) PCT Filed: Sep. 24, 2012

(86) PCT No.: PCT/EP2012/068787
§ 371 (c)(1),
(2) Date: Mar. 26, 2014

(87) PCT Pub. No.: WO2013/045401
PCT Pub. Date: Apr. 4, 2013

(65) Prior Publication Data
US 2014/0224618 A1    Aug. 14, 2014

(30) Foreign Application Priority Data
Sep. 26, 2011    (EP) ..................... 11182771

(51) Int. Cl.
*B65G 25/00*    (2006.01)
*B65G 25/08*    (2006.01)
*B65G 47/14*    (2006.01)

(52) U.S. Cl.
CPC ............ *B65G 25/08* (2013.01); *B65G 47/1478* (2013.01)

(58) Field of Classification Search
CPC .... B65G 25/00; B65G 2812/12; B65G 25/04; B65G 2811/093; B65G 47/1471
USPC ........... 198/773, 774.4, 459.5, 443, 444, 396; 414/746.1, 746, 4, 746.6
See application file for complete search history.

(56) References Cited

U.S. PATENT DOCUMENTS

| | | | |
|---|---|---|---|
| 3,168,190 A * | 2/1965 | Nienstedt | 198/444 |
| 4,465,422 A * | 8/1984 | Blust et al. | 414/746.6 |
| 5,174,351 A * | 12/1992 | Lindenblatt et al. | 198/774.1 |
| 5,385,227 A * | 1/1995 | Marsh | 198/773 |
| 5,641,263 A * | 6/1997 | Ogrinc et al. | 414/745.9 |
| 5,647,472 A | 7/1997 | Fierkens | |
| 5,678,681 A | 10/1997 | Klockars et al. | |

FOREIGN PATENT DOCUMENTS

EP    0945373 A2    9/1999

* cited by examiner

*Primary Examiner* — James R Bidwell
(74) *Attorney, Agent, or Firm* — McDermott Will & Emery LLP

(57) ABSTRACT

An apparatus for separating piece goods which are to be stored in an automated store comprises a stepped conveyor for conveying piece goods from a stockpile beyond an upper edge of the stepped conveyor to a collecting device, wherein the stepped conveyor comprises an inclined bearing surface and a first step which can be moved in parallel over the bearing surface with a conveying edge which is parallel to the bearing surface, wherein the spacing between the bearing surface and the conveying edge corresponds to a minimum step height which suffices to push parallelepiped-shaped piece goods upwards, and a control device for actuating the stepped conveyor, which control device is coupled to a sensor which detects whether a piece goods item has been conveyed beyond the upper edge.

20 Claims, 10 Drawing Sheets

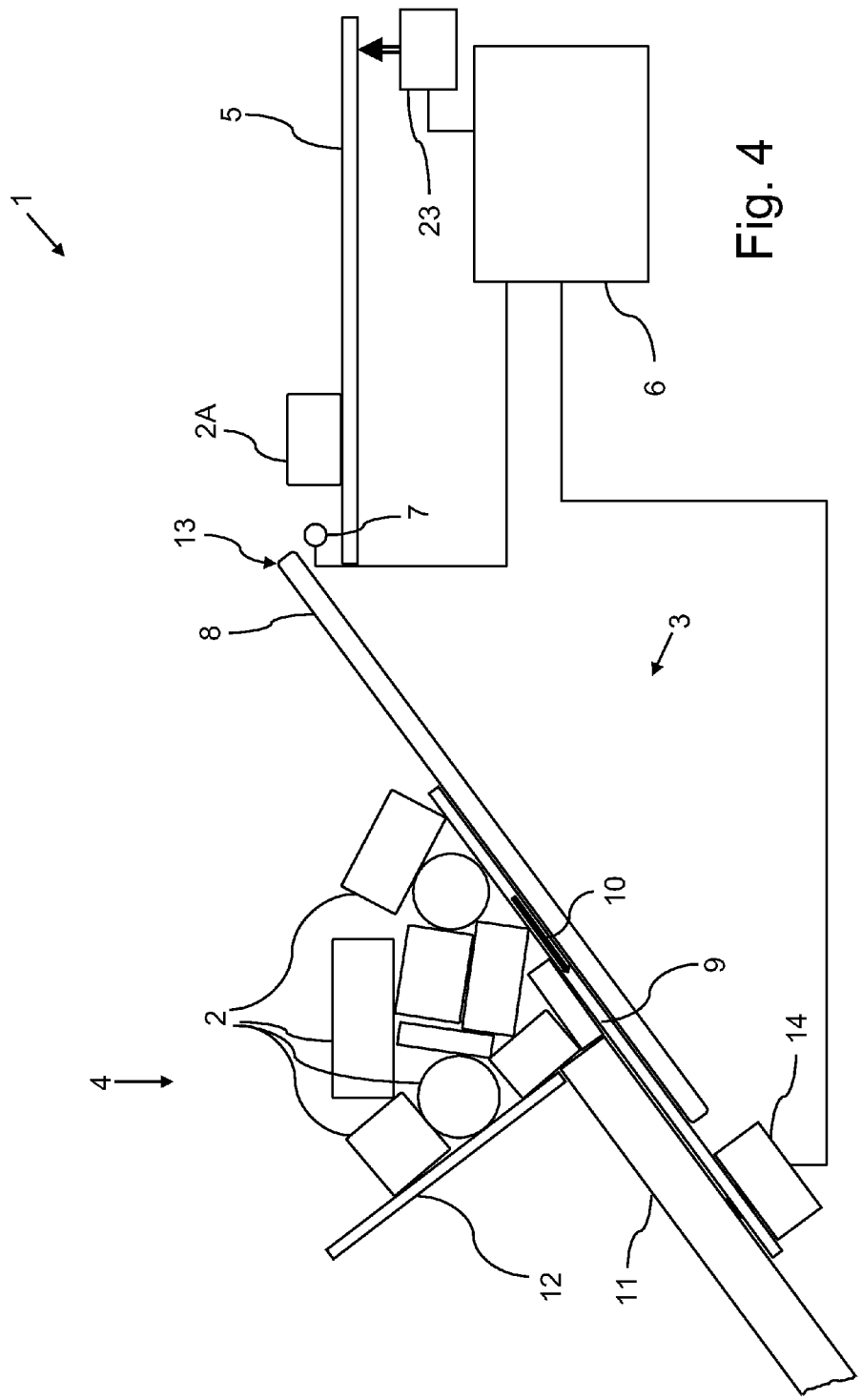

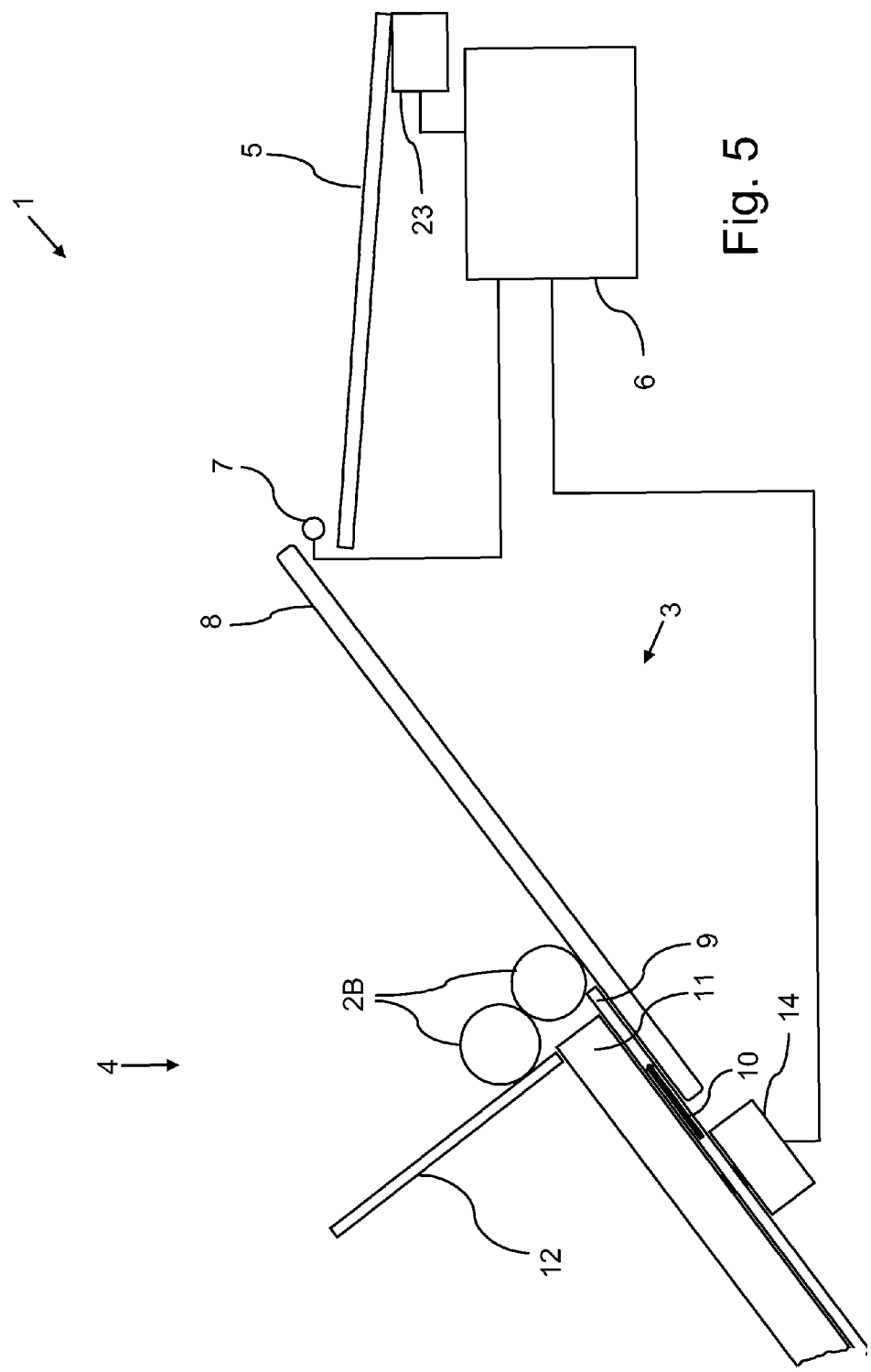

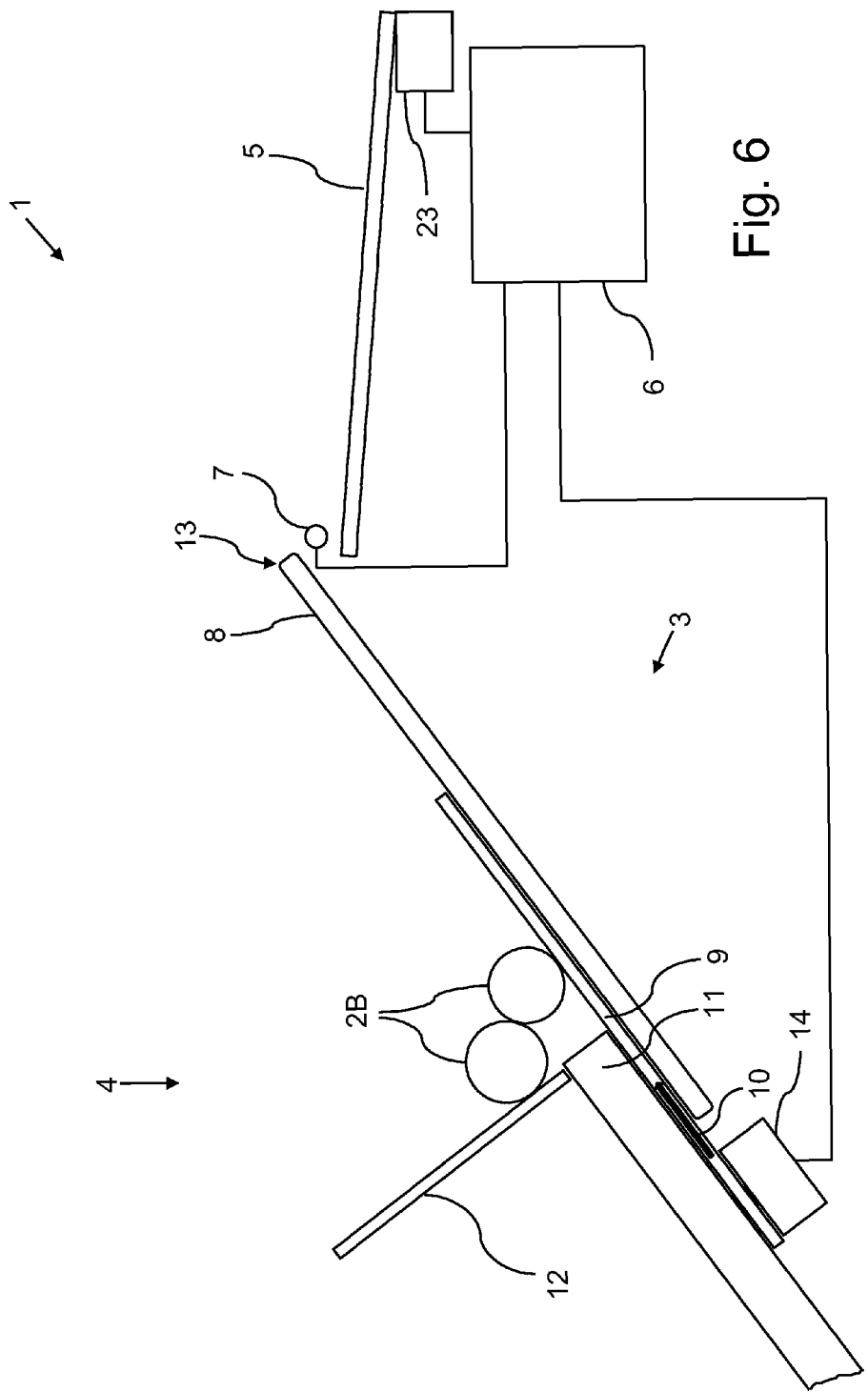

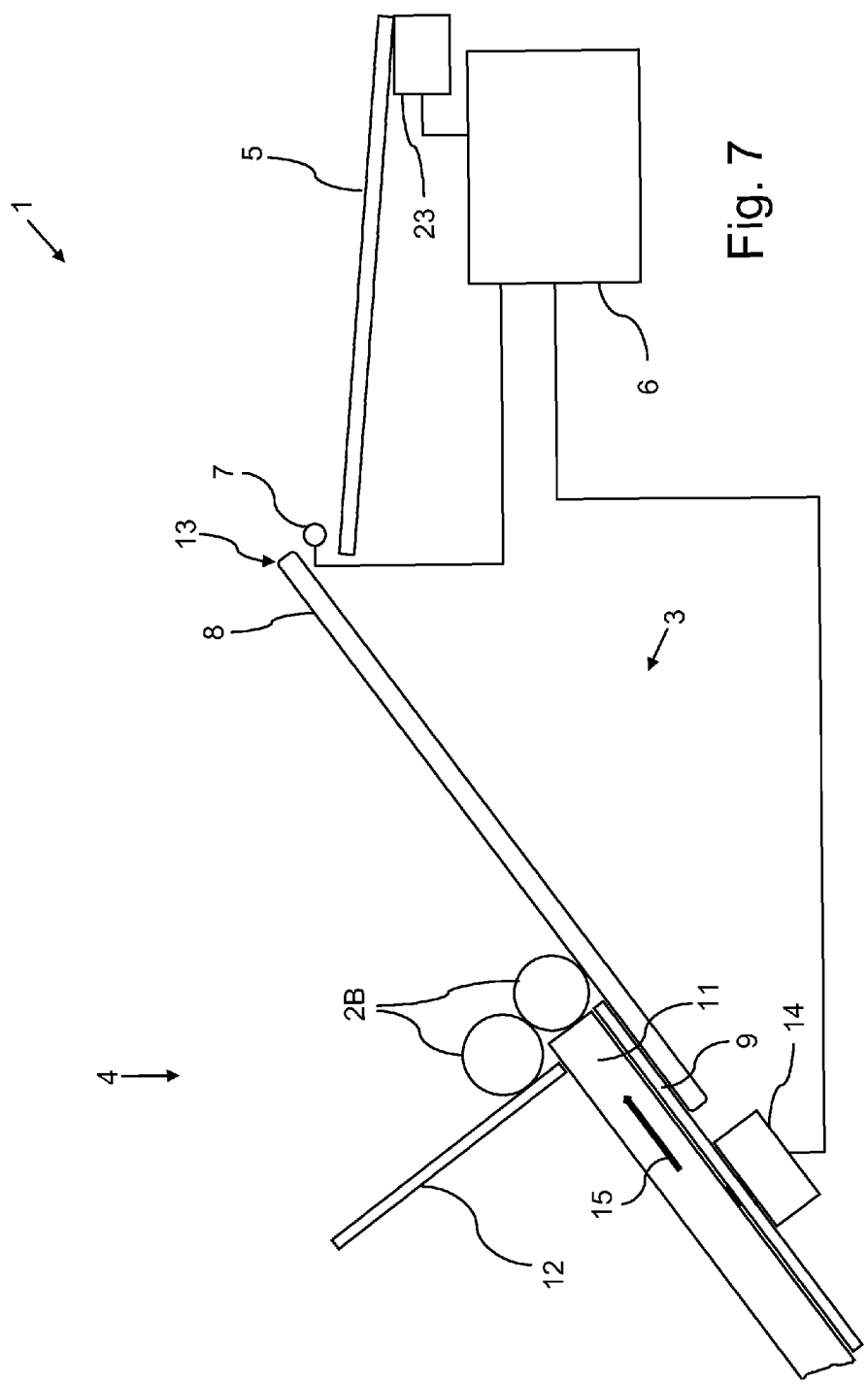

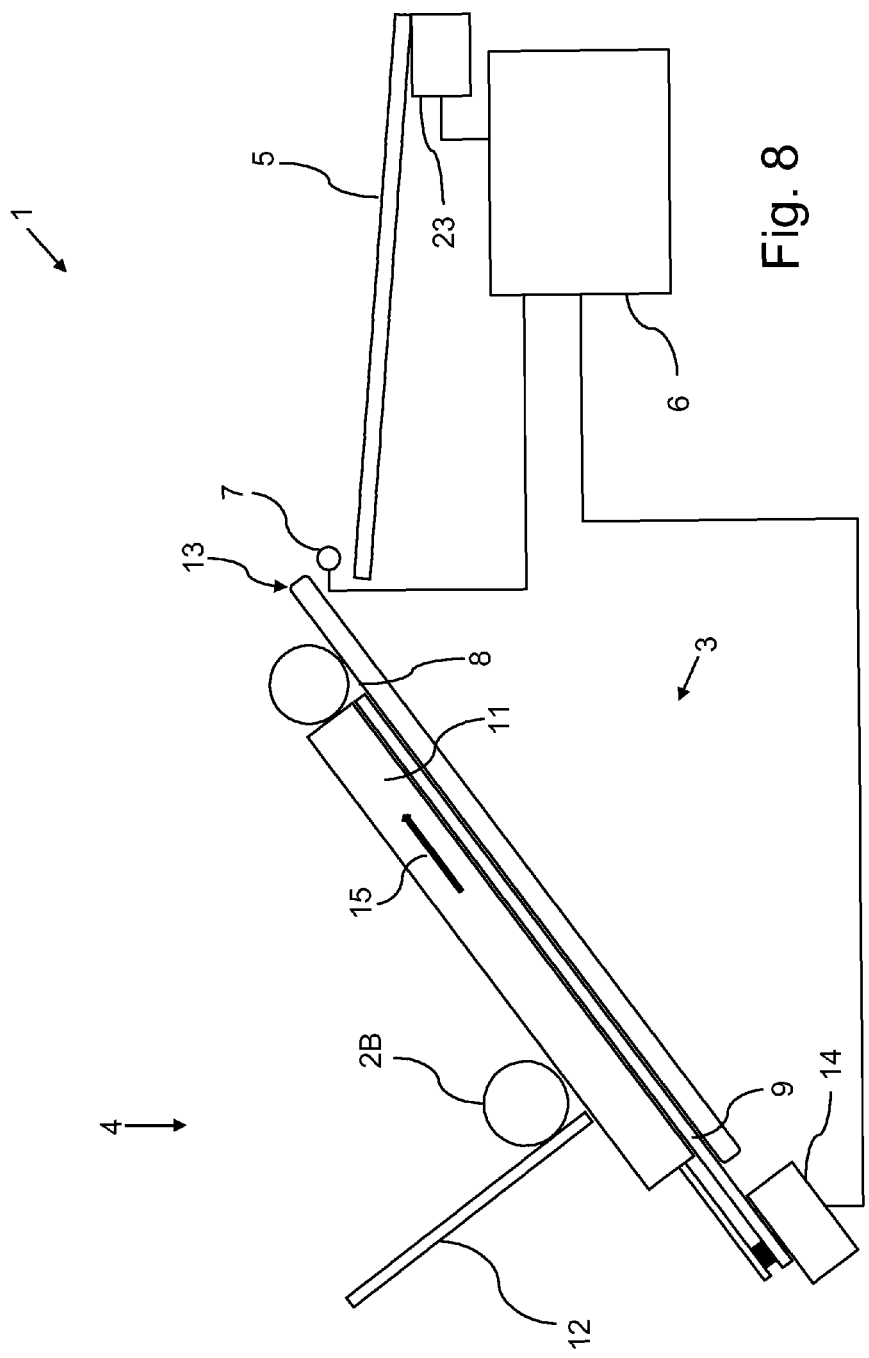

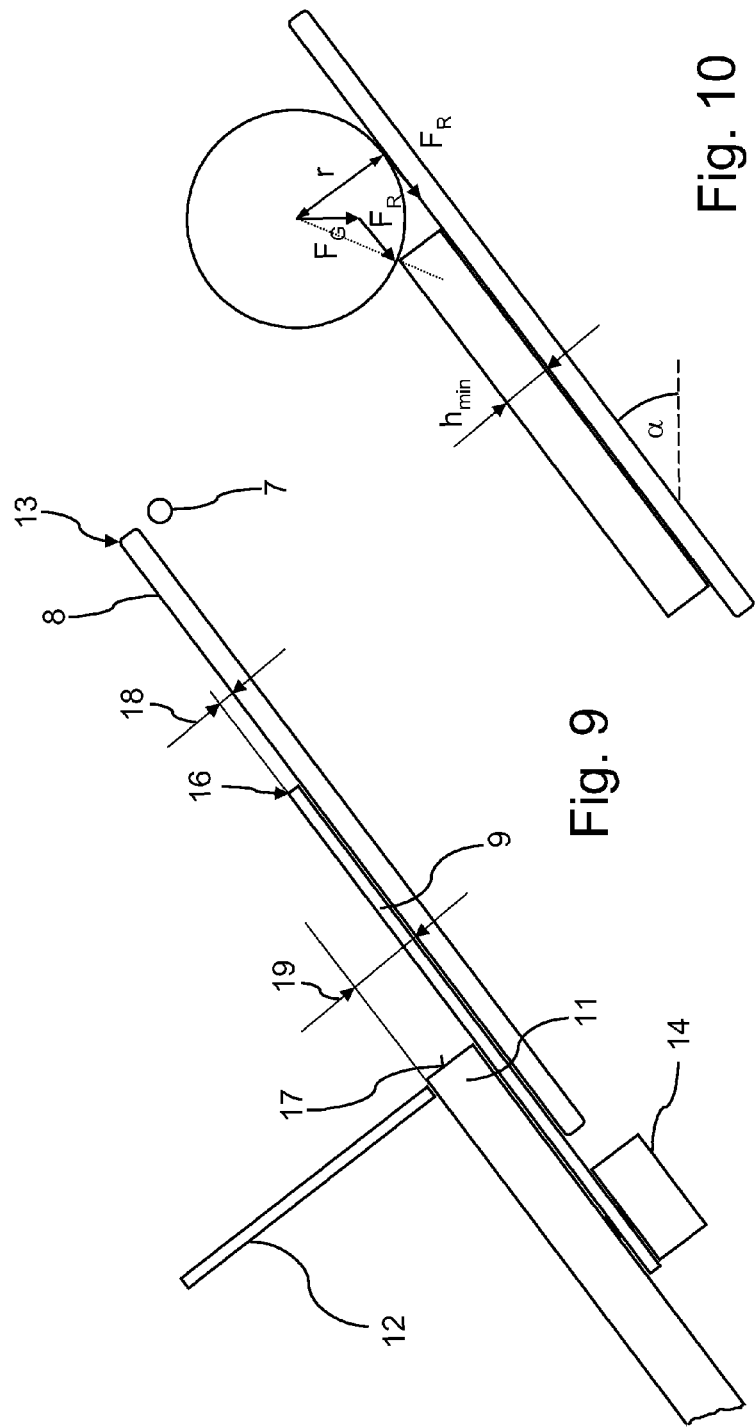

APPARATUS AND METHOD FOR SEPARATION OF PIECE GOODS TO BE PLACED IN STORAGE IN AN AUTOMATED STORAGE UNIT

CROSS-REFERENCE TO RELATED APPLICATION

This application is the U.S. National Phase under 35 U.S.C. §371 of International Application No. PCT/EP2012/068787, filed on Sep. 24, 2012, which claims the benefit of EP 11182771.3, filed Sep. 26, 2011. The entire contents of these applications are incorporated by reference herein.

BACKGROUND

Step conveyors and methods of the type stated initially are known, for example, from the documents DE 10 2004 012 133 A1 and EP 1 652 799 A1.

The known step conveyors have the disadvantage, on the basis of the low step height, that they are not able to convey piece goods upward, and if they are lying on the contact surface, no edge projecting at least approximately perpendicular from the contact surface can lie against the conveying step. This particularly applies to cylindrical piece goods, such as bottles or cylindrical cans, for example.

SUMMARY

The disclosure relates to an apparatus for separation of piece goods to be placed in storage in an automated storage unit, having a step conveyor for conveying piece goods out of a supply, beyond a top edge of the step conveyor, onto a collection device, wherein the step conveyor comprises an inclined contact surface and a first step that can be moved parallel to the contact surface, having a conveying edge parallel above the contact surface, wherein the distance between the contact surface and the conveying edge corresponds to a minimal step height, which suffices for pushing block-shaped piece goods upward, and a control device for controlling the step conveyor, which device is coupled with a sensor, which detects whether an article of piece goods has been conveyed beyond the upper edge. Furthermore, the disclosure relates to a method for separation of piece goods to be placed in storage in an automated storage unit, using a step conveyor having an inclined contact surface having an upper edge, a supply disposed at the lower end of the contact surface, for accommodating piece goods, and a first step that can be moved parallel above the contact surface, from the supply to the upper edge, having a conveying edge parallel to the contact surface, wherein the distance between the contact surface and the conveying edge corresponds to a minimal step height, which suffices for pushing block-shaped piece goods upward, wherein the supply is filled with piece goods, and the first step is repeatedly moved from the supply to the upper edge, until conveying of a further article of piece goods over the upper edge is no longer detected.

In order to achieve the most effective separation possible, or in other words, in order to ensure that as few piece goods as possible pass over the upper edge of the contact surface at the same time, a low height of the conveying step is aimed at. The height of the conveying step, that is, the distance between the contact surface and the conveying edge (usually the upper edge of a conveying plate, facing forward), should merely be so high that the step suffices for pushing piece goods, usually block-shaped piece goods, upward. In this connection, unevenness and rounded edges of the block-shaped piece goods to be transported, on the one hand, as well as movement speeds of the conveying step and the mass of the piece goods and the resulting inertia and friction forces, on the other hand, may be taken into consideration. If the step height is selected too low, the case can occur, for example, that the conveying step moving upward pushes itself under the article of piece goods.

It is therefore the task of the subject technology to create an apparatus and a method for separation, which permit not only separation of block-shaped piece goods but also separation of cylindrical piece goods that are mixed with the block-shaped piece goods in a supply.

This task is accomplished, according to the disclosure, by means of an apparatus and methods having the characteristics described herein.

According to the disclosure, an apparatus for separation, of the type indicated initially, is characterized in that the step conveyor has a second step that can be moved parallel above the first step and the contact surface, having a step height that is at least so high that the second step is suitable for conveying cylindrical piece goods having the greatest expected diameter, and that the control device is configured in such a manner that it controls the step conveyor in such a manner that after the supply has been filled, the first step is repeatedly activated until the sensor no longer detects conveying of a further article of piece goods, and thereupon the second step is activated.

The method stated initially, for separation, is characterized, according to the disclosure, in that a step conveyor is used that has a second step that can be moved parallel above the first step and the contact surface, having a step height that is at least so high that the second step is suitable for conveying cylindrical piece goods having the greatest expected diameter, wherein after repeatedly moving the first step, until conveying of a further article of piece goods beyond the upper edge is no longer detected, the second step is moved from the supply to the upper edge. Preferably, the second step is subsequently repeatedly moved from the supply to the upper edge, until conveying of a further article of piece goods beyond the upper edge is no longer detected.

The minimum height of the second step depends, at first, on the maximal expected diameter of the cylindrical piece goods, and on the inclination of the contact surface, and is greater, in every case, than the radius of the cylindrical piece goods, minus the product of the radius and the cosine of inclination. The minimum step height calculated in this manner is furthermore increased on the basis of the friction and inertia forces that occur during pushing up, where this increase grows with the ratio of the friction and inertia forces to the weight of the article of piece goods, but does not become greater than the maximal expected radius. The minimum step height may be determined experimentally.

The conveying edge of the first step can be formed not just by an edge of a plate, but also by a tensed wire or cable. Preferably, however, it is formed by the front upper edge of a step plate. In a preferred apparatus, the first step comprises a level plate having a conveying surface that follows the conveying edge, perpendicular to the plate plane. Preferably, the second step also comprises a level plate having a conveying surface perpendicular to the plate plane. The plate of the first and/or of the second step can also be formed from a plurality of parallel strip segments coupled so as to pivot, which are connected with one another in the manner of a roller blind and guided by way of the contact surface. Furthermore, the plate or the segments of the second step can be of a lesser thickness than would correspond to the step height, for example just as thick as the plate or the segments of the first step. In this case, the second step, at the upper edge, has a plate that is angled away from the plate or the uppermost segment, perpendicular to the contact surface, the front surface of which plate forms the conveying surface that determines the step height.

The provision of the second step having a step height suitable for transporting cylindrical piece goods, in combination with the sequence of the use of the first and second steps, according to the disclosure, not only permits separation of any desired shape of articles of piece goods; it furthermore ensures that first the block-shaped piece goods are sorted out of the supply, before the cylindrical piece goods are placed in storage.

In preferred embodiments, the control device is configured so that it controls the step conveyor in such a manner that the first step is either moved back or moved along with the second step, while the second step is being activated. It is preferred that the first step moves along with the second. This prevents the formation of a gap below the second conveying step, in which small piece goods could become jammed.

A further development of the disclosure is characterized in that the sensor detects arrival of piece goods on the collection device, where the control device, when arrival of an article of piece goods or multiple piece goods on the collection device is detected, interrupts conveying of further piece goods to the collection device until the article of piece goods or the piece goods have been removed from the collection device and transported further. Interruption of further conveying of piece goods to the collection device makes undisturbed detection and undisturbed picking up of the piece goods lying on the collection device possible, for further transport to an automated storage unit.

Preferably, the collection device has a plate that can pivot about an axis parallel and adjacent to the upper edge, where a pivot drive is coupled with the control device, where the plate is inclined before an article of piece goods is conveyed beyond the upper edge, in such a manner that it drops away from the upper edge, so that arriving piece goods can slide down on the plate, and where the control device, when arrival of an article of piece goods or multiple piece goods on the collection device is detected, moves the plate into the horizontal position, by way of the pivot drive, so that sliding of the piece goods is braked (either completely or in such a manner that the sliding article of piece goods slides sufficiently slowly against a stop). The plate is preferably inclined at least 30° relative to the horizontal, in order to ensure that the packages slide down.

Advantageous and/or preferred further developments of the disclosure are characterized in the dependent claims.

BRIEF DESCRIPTION OF THE DRAWINGS

In the following, the subject technology will be described in greater detail, using a preferred exemplary embodiment shown in the drawings. The drawings show:

FIG. 4, the apparatus shown in FIGS. 1 to 3, after the block-shaped article of piece goods arrives on the collection device and during retraction of the first conveying step;

FIG. 5, the apparatus shown in FIGS. 1 to 4, after all the block-shaped piece goods have been conveyed onto the collection device and transported further by the latter, where the apparatus is shown at the start of the renewed upward movement of the first conveying step;

FIG. 6, the apparatus shown in FIG. 5, during upward movement of the first conveying step;

FIG. 7, the apparatus shown in FIGS. 5 and 6, at the beginning of upward movement of the second conveying step;

FIG. 8, the apparatus shown in FIG. 7, during upward movement of the second conveying step, which is moving a cylindrical article of piece goods;

FIG. 9, a schematic sectional side view of the step conveyors with the two conveying steps;

FIG. 10, a sketch that illustrates the forces that occur when pushing up a cylindrical article of piece goods, and their influence on the minimum step height that is provided.

DETAILED DESCRIPTION

Figure 1:
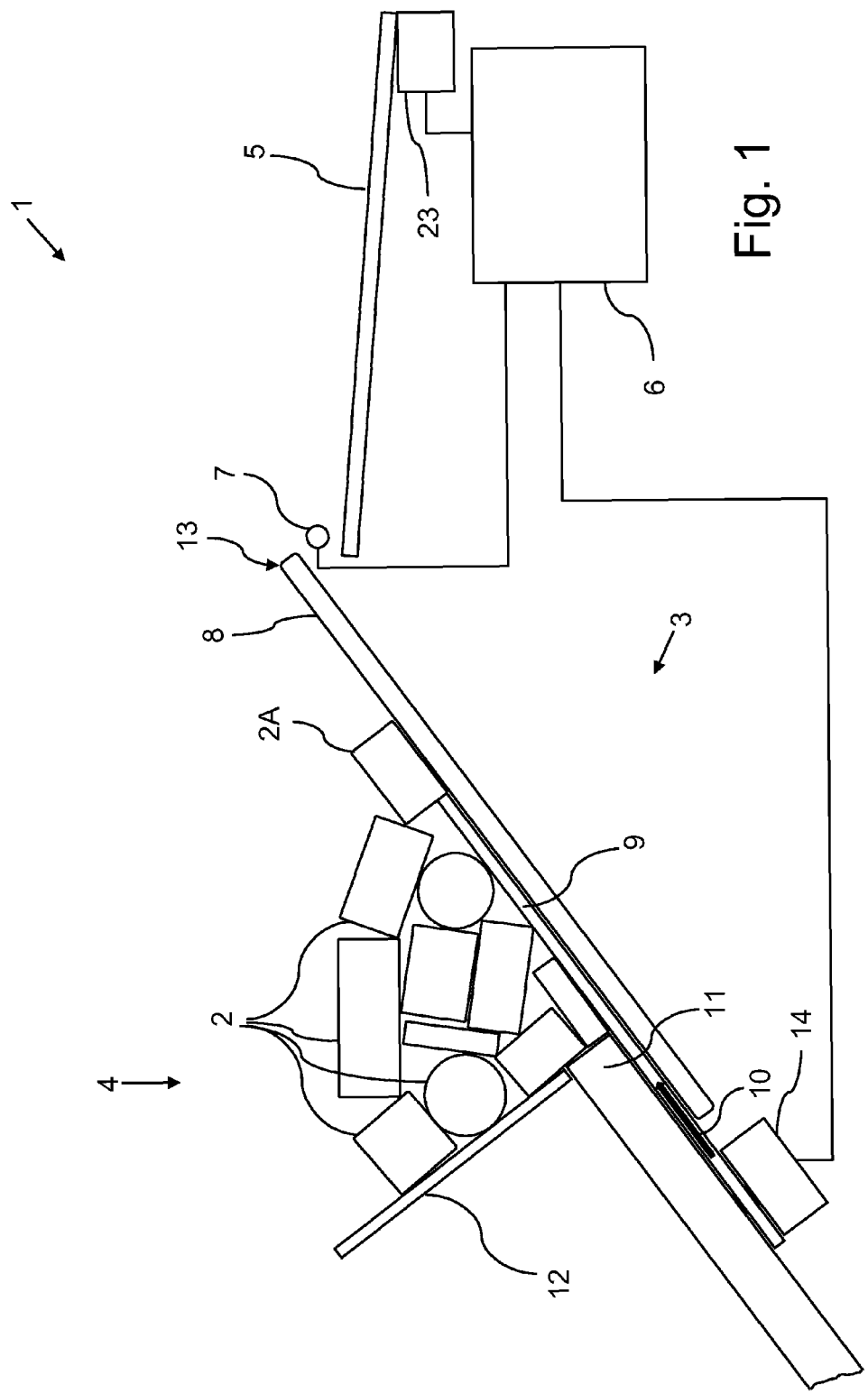
FIG. 1, a schematic sectional view of the separation apparatus according to the disclosure, with a supply filled with block-shaped and cylindrical piece goods, during conveying of a block-shaped article of piece goods by the first conveying step.

FIG. 1 shows a schematic sectional side view of the apparatus 1 for separation of piece goods 2, which are to be placed in storage in an automated storage unit. The piece goods 2 to be placed in storage are first supposed to be separated, subsequently identified and measured, and then transferred in a predetermined position (orientation) at a predetermined location of a storage apparatus (gripper) of an automated storage unit.

The separation apparatus 1 comprises a step conveyor 3 that is configured with a contact surface 8, by way of a slanted plane. A first conveying step 9 moves above the contact surface 8; this step has a plate that is guided parallel above the contact surface 8, having a face surface, where piece goods 2A that lie on the contact surface 8 and against the face surface of the first conveying step 9 are pushed upward by the conveying step 9, beyond an upper edge 13 of the contact surface 8, when the conveying step 9 is moved upward in the direction of the arrow 10 and driven by a drive 14.

In place of the first conveying step 9, multiple first conveying steps can also be provided, which are disposed one on top of the other and parallel to the contact surface 8. Furthermore, the conveying edge, that is, the upper edge of the face surface of the conveying plate, can assume not only a horizontal position, in other words a position perpendicular to the movement direction of the plate, but also can be disposed at a slant to this orientation, as is described in the document EP 1 652 799 A1 that has already been mentioned. In the preferred embodiment that is shown in FIG. 1, the first conveying step 9 merely comprises a conveying plate having a face surface and conveying edge perpendicular to the movement direction (arrow 10).

In the lower section of the inclined plane, a supply bunker 4 is formed above the contact surface 8 and the plates of the conveying steps, by placement of lateral delimitation walls 12, which bunker can accommodate a plurality of block-shaped and/or cylindrical piece goods 2. The piece goods are preferably containers or packages of medications, such as block-shaped boxes or bottles and cans.

Adjacent to the upper edge 13 of the contact surface 8, beyond which the piece goods 2 are conveyed by the step conveyor 3, a collection device in the form of a collection surface 5 is disposed. The piece goods 2 pushed beyond the upper edge 13 fall onto this collection surface 5. Furthermore, a sensor 7 is schematically shown in FIG. 1, which detects when an article of piece goods or multiple piece goods are being conveyed beyond the upper edge 13 and are arriving on the surface 5 of the collection device. The collection surface 5 is inclined, where it drops away from the side adjacent to the upper edge 13, so that arriving piece goods move (slide) away from the upper edge 13. The collection device has a drive 23 assigned to it, which can move the collection surface 5 into a horizontal position.

Both the sensor 7 and the drive 14 of the step conveyor 3 and the drive 23 of the collection device are coupled with a control device 6. The control device 6 is furthermore coupled with a gripping apparatus (not shown). The gripping apparatus is disposed above the collection surface 5 and serves to grasp the piece goods 2 that lie on it, if applicable to bring them into the detection range of a scanner for detection of imprinted identification information or a sensor for detection of dimensions of the article of piece goods, and to transfer them to a storage placement apparatus of the automated storage unit. Furthermore, an optical scanner or an image recording device coupled with the control device 6 can be disposed above and/or below the collection surface 5, which can detect the location and position (orientation) of the piece goods 2 lying on the collection surface 4, so that the control device 6, using this information, can activate the gripping device in such a manner that it grasps one of the arriving piece goods, in targeted manner, and transports it further.

Figure 2:
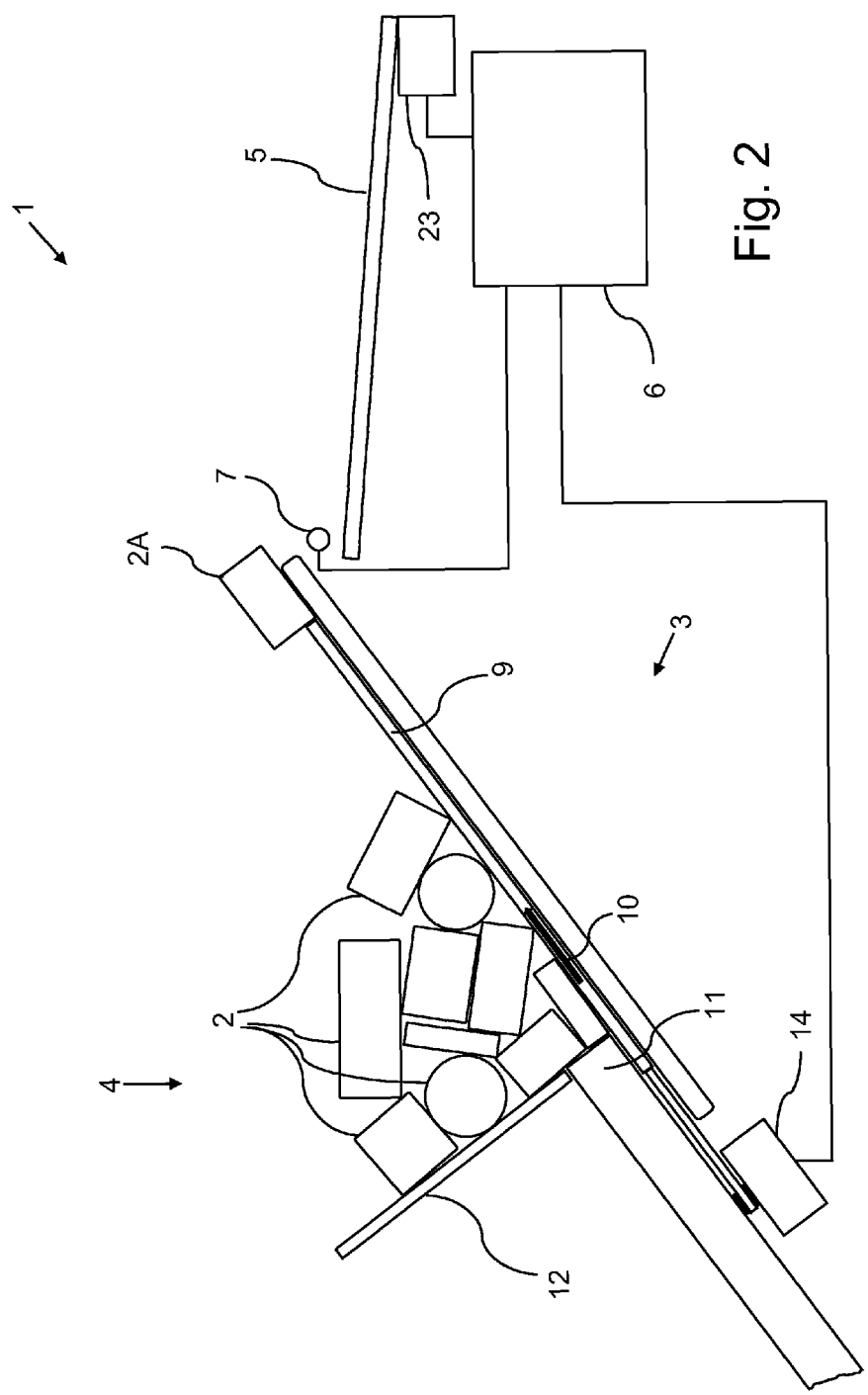
FIG. 2, the apparatus according to FIG. 1 during further conveying upward of the block-shaped article of piece goods, just before it passes over the upper edge.
Figure 3:
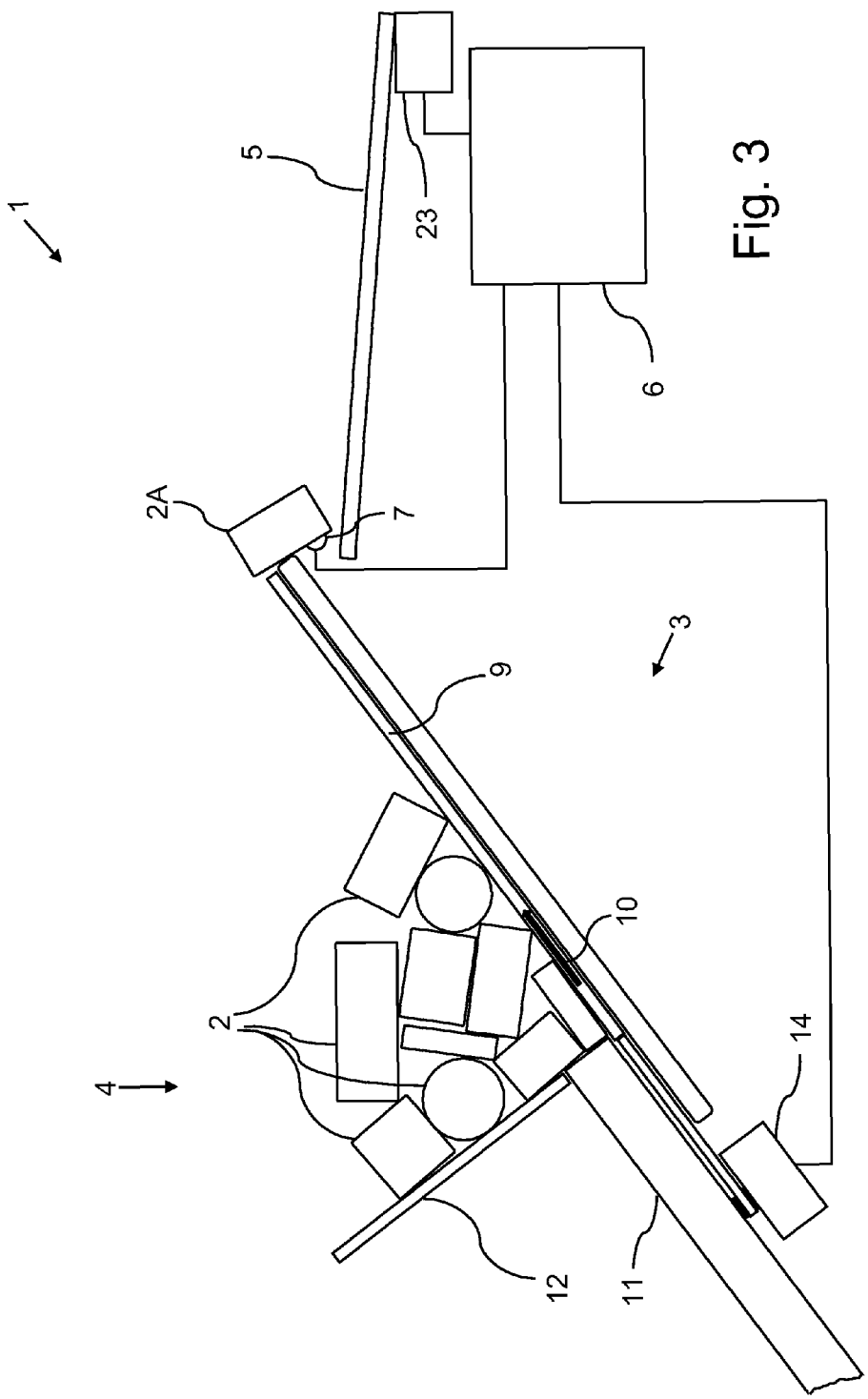
FIG. 3, the apparatus shown in FIGS. 1 and 2, during passage of the block-shaped article of piece goods over the upper edge of the step conveyor.

FIGS. 1 to 4 illustrate the function of the first conveying step 9 for conveying block-shaped piece goods 2A out of the supply 4 onto the collection surface 5. FIG. 1 shows how the front surface with the conveying edge of the conveying plate of the first conveying step 9, which edge faces upward, makes contact with a side surface of a block-shaped article of piece goods 2A that is lying on the contact surface 8. The conveying step 9 then moves in the direction of the arrow 10, so that the block-shaped article of piece goods 2A is taken along and pushed upward. FIG. 2 shows the moment when the article of piece goods approaches the upper edge of the contact surface 8. In a preferred embodiment, a sensor (not shown in the drawing), for example a photo eye, is disposed just ahead of the upper end of the contact surface 8, in such a manner that it detects the approach of one or more piece goods 2A being pushed by the conveying step to the upper edge 13. As soon as such an approach has been detected, the conveying speed is reduced. This has the result that when multiple piece goods 2A are pushed simultaneously, the likelihood decreases that two or more piece goods 2A pass beyond the upper edge 13 before the conveying step can be stopped and then moved back. FIG. 3 shows the moment when the article of piece goods 2A tips over the upper edge 13 of the contact surface 8 and thereby gets into the detection region of the sensor 7. Immediately after detection of the passage of the article of piece goods 2A over the conveying edge 13 and the arrival on the collection surface 5, the drive 23 brings the collection surface 5 into a horizontal position, so that the downward sliding movement of the article of piece goods 2A is stopped. FIG. 4 shows the state after the article of piece goods 2A has assumed a rest position on the collection surface 5. In FIG. 4, it is furthermore shown how the first conveying step 9 is moved back in the direction of the arrow 10, into the starting position. The collection surface 5 is situated in the horizontal position and remains in it until the article of piece goods 2A has been removed. As soon as the article of piece goods 2A has been removed from the collection surface 5 by the gripper device, the control device 6 can instruct the drive 14 of the step conveyor 3 to move the first conveying step 9 upward again, where the conveying step grasps a further article of piece goods 2 or multiple further piece goods 2 and pushes them upward on the contact surface 8.

The first conveying step 9 is subsequently moved up and back until all the block-shaped piece goods 2 have been conveyed beyond the upper edge 13 onto the collection surface 5, and removed from there by means of the gripper device. Because of the low height of the conveying step 9, first only the block-shaped piece goods that come to lie on the contact surface 8 in front of the conveying step 9 are conveyed upward and further onto the collection surface 5.

FIG. 5 schematically shows the state that occurs after all the block-shaped piece goods have been conveyed. In the example shown, two cylindrical piece goods 2B remain in the supply chamber 4. In FIGS. 5 and 6, it is shown how the control device 6 again controls the drive 14 of the step conveyor 13, in such a manner that the latter moves the first conveying step 9 upward. In this connection, however, no further article of piece goods can be conveyed beyond the upper edge 13, so that the control device 6 recognizes, on the basis of the signal of the sensor 7, that no further piece goods 2 can be conveyed using the first conveying step 9.

In an alternative embodiment, it is also possible that activation of the first conveying step 9 is repeated several (a few) times after no arrival of an article of piece goods 2 on the collection surface 5 has been detected by the sensor 7. For example, this can be repeated twice or three times. This serves to ensure that a last block-shaped article of piece goods that might not yet have been detected is conveyed during one of the further conveying attempts, for example if it first had to be tilted into a suitable position within the supply (for example, a first conveying attempt could lead to tilting of the last block-shaped article of piece goods, so that upward conveying of the block-shaped article of piece goods only succeeds during the second attempt).

After the control device 6 has now detected that no further (block-shaped) piece goods 2 can be transported any longer, using the first conveying step 9, the control device 6 at first assumes that there might still be cylindrical piece goods in the supply 4. It thereupon activates a second conveying step 11, using the drive 14, as illustrated in FIGS. 7 and 8. FIG. 7 shows the moment when the movement of the second conveying step 11 along the arrow 15 starts. The front surface of the second conveying step 11 lies against a cylindrical article of piece goods 2B. FIG. 8 shows the time point when the cylindrical article of piece goods 2B has been moved upward (rolled and/or pushed) on the contact surface 8, by means of the upward movement of the second conveying step 11, just before the upper edge 13 has been reached. By means of further upward movement of the second conveying step 11, finally the cylindrical article of piece goods 2B is transported beyond the upper edge 13 onto the collection surface 5. There the article of piece goods 2B can be grasped and transported further by the gripping device, controlled by the control device 6.

In the preferred exemplary embodiment shown in FIGS. 7 and 8, the first conveying step 9 is moved upward parallel with the second conveying step 11. In an alternative embodiment, not shown here, the first conveying step 9 could remain in the retracted position while the second conveying step 11 is moved upward.

FIG. 9 illustrates once again the elements of the step conveyor 3 (without piece goods 2 lying on it), in greater detail. In the exemplary embodiment shown, two conveying steps, namely a first conveying step 9 and a second conveying step 11, are disposed above a contact surface 8. Both conveying steps 9 and 11 are moved by a drive 14, shown only schematically here. The first conveying step 9, with its conveying edge 16 that faces upward, has the step height 18, which preferably amounts to 8-20 mm, for example 15 mm, and is composed of a plate thickness of 10 mm and an air gap of 5 mm under the plate, for example. The conveying edge 16 can (as shown in the example) be formed by a right-angle outer edge. However, it is also possible that the edge is configured to have an acute angle, so that only the edge itself, but not the front surface, lies against the side wall of the article of piece goods that lies on the contact surface 8 and is to be transported upward. The second conveying step 11 is shown in the retracted position and has the step height 19 shown, which amounts, for example, to 45 mm. The second conveying step has a conveying front surface 17 with which it pushes the (cylindrical) piece goods to be transported upward. Furthermore, in FIG. 9 a delimitation wall 12 of the supply bunker 4 is shown, as is the sensor 7 that detects passage of the piece goods over the upper edge 13 of the contact surface 8.

FIG. 10 illustrates the dimensioning of the minimum height hmin of the second conveying step as a function of the expected maximal radius r of cylindrical piece goods to be conveyed, and of the inclination angle α of the contact surface 8. If one were to ignore the inertia forces and friction that occur, particularly adhesion friction when starting to push the piece goods, this would result in a minimum height hmin of the second step that would correspond to the radius r of the cylindrical piece goods minus the product of the radius r and the cosine of the inclination (cos α), in other words $$h\min = r - r^* \cos \alpha = r^*(1 - \cos \alpha) \quad (1)$$

The minimum step height hmin determined in this manner is furthermore increased on the basis of the friction and inertia forces that occur during upward pushing, which are indicated in FIG. 10 with FR, where in FIG. 10, the combination of a weight force vector with the (displaced) friction force vector is shown. The upper edge of the step having the height hmin is not allowed to engage below the intersection point at which the extended vector of the composite force (shown as a dotted line) intersects the mantle of the cylindrical article of piece goods, because otherwise, tipping over the step is threatened. The stated increase in the minimum step height hmin grows with the ratio of friction and inertia forces FR to the weight FG of the article of piece goods, but does not become greater than the maximal expected radius r. In particular, light cylindrical piece goods (having a low weight force) and great friction force require a higher step, which comes closer to the maximal value of the minimum step height Max(hmin)=r, the radius. The minimum step height may be determined experimentally.

Figure 11:
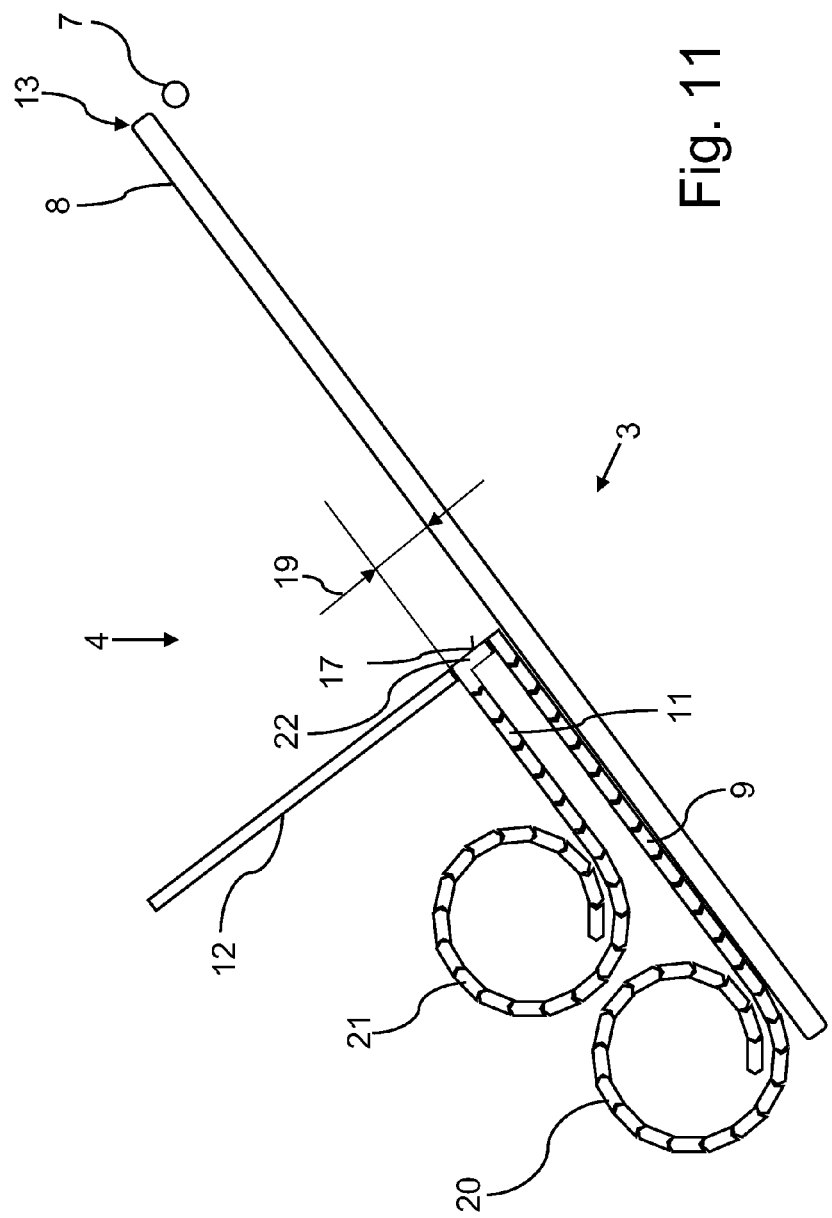
FIG. 11, a schematic sectional side view of the step conveyor, in which the plates of the two conveying steps are configured as roller blinds.

FIG. 11 schematically shows a preferred configuration of the plates of the two steps 9 and 11 in the form of roller blinds. The plates of the first step 9 and of the second step 11 are formed, in each instance, from a plurality of parallel strip segments that are coupled so as to pivot, and are guided above the contact surface 8 in parallel lateral guides (not shown), and guided in arc-shaped lateral guides at the lower end of the contact surface 8. In this way, the construction space required in the plane of the contact surface 8 is shortened. Furthermore, the segments of the second step are selected to be just as thick as the segments of the first step, which simplifies production. The second step 11, at the upper edge, has a plate 22 that is angled away perpendicular to the contact surface 8, from the uppermost segment, the front surface 17 of which forms the conveying surface that determines the step height.

The invention claimed is:

1. An apparatus for separation of piece goods to be placed in storage in an automated storage unit, comprising:
   a step conveyor for conveying piece goods from a supply, beyond an upper edge of the step conveyor, onto a collection device, wherein the step conveyor comprises an inclined contact surface and a first step that can be moved parallel above the contact surface, having a conveying edge parallel to the contact surface, wherein the distance between the contact surface and the conveying edge corresponds to a step height that allows pushing block-shaped piece goods upward; and
   a control device for controlling the step conveyor, the control device coupled with a sensor, wherein the sensor detects whether an article of piece goods has been conveyed beyond the upper edge,
   wherein the step conveyor has a second step that can be moved parallel above the first step and the contact surface, having a step height that is at least a height such that the second step is suitable for conveying cylindrical piece goods having the greatest diameter to be expected, and
   the control device is configured to control the step conveyor so that after the supply has been filled, the first step is repeatedly activated until the sensor no longer detects conveying of a further article of piece goods, and thereupon the second step is activated.

2. The apparatus for separation according to claim 1, wherein the control device is configured to control the step conveyor so that the second step is repeatedly activated until the sensor no longer detects conveying of a further article of piece goods.

3. The apparatus for separation according to claim 1, wherein the control device is configured to control the step conveyor so that the first step is moved back or moved along with the second step, while the second step is being activated.

4. The apparatus for separation according to claim 1, wherein the first step comprises a level plate having a conveying surface that follows the conveying edge and lies perpendicular to the plate plane.

5. The apparatus for separation according to claim 1, wherein the second step comprises a level plate having a conveying surface perpendicular to the plate plane.

6. The apparatus for separation according to claim 4, wherein the plate of the first step is formed from a plurality of parallel strip segments coupled so as to pivot, which are guided in parallel lateral guides, above the contact surface, and can be wound up onto a roll at the lower end of the contact surface or are guided in arc-shaped lateral guides in such a manner that the construction space required in the plane of the contact surface is shortened.

7. The apparatus for separation according to claim 1, wherein the sensor detects the arrival of piece goods on the collection device, wherein the control device, if arrival of an article of piece goods or multiple piece goods on the collection device is detected, interrupts the conveying of further piece goods onto the collection device until the article of piece goods has been removed from the collection device and transported further.

8. The apparatus for separation according claim 1, wherein the collection device has a plate that can be pivoted about an axis parallel and adjacent to the upper edge, wherein a pivot drive is coupled with the control device, wherein the plate is inclined before conveying an article of piece goods over the upper edge, so that the article of piece goods drops away from the upper edge, so that arriving piece goods can slide downward on the plate, and wherein the control device, when arrival of one or more articles of piece goods on the collection device is detected, moves the plate into the horizontal position, using the pivot drive, so that further sliding of the piece goods is braked.

9. A method for separation of piece goods to be placed in storage in an automated storage unit, using a step conveyor comprising:
- an inclined contact surface having an upper edge,
- a supply disposed at the lower end of the contact surface, for accommodating piece goods that comprise block-shaped and cylindrical piece goods,
- a first step that can be moved parallel above the contact surface, from the supply all the way to the upper edge, having a conveying edge parallel to the contact surface, wherein the distance between the contact surface and the conveying edge corresponds to a minimal step height, which suffices for pushing block-shaped piece goods upward, and
- a second step that can be moved parallel above the first step and the contact surface, having a step height that is at least so high that the second step is suitable for conveying cylindrical piece goods having the greatest diameter to be expected, the method comprising:
- filling the supply with piece goods;
- repeatedly moving the first step for conveying piece goods from the supply to the upper edge, until conveying of a further article of piece goods over the upper edge is no longer detected; and
- if conveying of a further article of piece goods over the upper edge is no longer detected, moving the second step for conveying piece goods from the supply to the upper edge.

10. The method for separation according to claim 9, further comprising repeatedly moving the second step from the supply to the upper edge, until conveying of a further article of piece goods over the upper edge is no longer detected.

11. The method for separation according to claim 9, further comprising moving the first step back or along with the second step, while the second step is moved.

12. The apparatus for separation according to claim 5, wherein the plate of the second step is formed from a plurality of parallel strip segments coupled so as to pivot, which are guided in parallel lateral guides, above the contact surface, and can be wound up onto a roll at the lower end of the contact surface or are guided in arc-shaped lateral guides in such a manner that the construction space required in the plane of the contact surface is shortened.

13. An apparatus for separation of piece goods to be placed in storage in an automated storage unit, comprising:
- a step conveyor for conveying piece goods from a supply, beyond an upper edge of the step conveyor, onto a collection device, wherein the step conveyor comprises an inclined contact surface, a first step that can be moved parallel above the contact surface, having a first height that allows for pushing a first type of good upward, and a second step that can be moved parallel above the first step and the contact surface, having a second height that allows for pushing a second type of good upward; and
- a control device for controlling the step conveyor, the control device coupled with a sensor, wherein the sensor detects whether an article of piece goods has been conveyed beyond the upper edge, wherein the control device is configured to control the step conveyor so that after the supply has been filled, the first step is repeatedly activated until the sensor no longer detects conveying of a further article of piece goods, and thereupon the second step is activated.

14. The apparatus for separation according to claim 13, wherein the first type of good is a block shaped good.

15. The apparatus for separation according to claim 13, wherein the second type of good is a cylindrical shaped good.

16. The apparatus for separation according to claim 13, wherein the first step comprises a first conveying edge parallel to the contact surface.

17. The apparatus for separation according to claim 16, wherein the first conveying edge is formed by a right-angle outer edge.

18. The apparatus for separation according to claim 16, wherein the first conveying edge is formed by an acute angle, wherein only the first conveying edge lies against the first type of good to be transported upward.

19. The apparatus for separation according to claim 15, wherein the second height is based on a radius of the cylindrical shaped good, an inclination angle of the inclined contact surface, and friction and inertia forces.

20. The apparatus for separation according to claim 13, wherein the second height is determined experimentally.

* * * * *